United States Patent
Pham (10) Patent No.: US 7,212,058 B2
(45) Date of Patent: May 1, 2007

(54) METHOD AND APPARATUS FOR ROBUST MODE SELECTION WITH LOW POWER CONSUMPTION

(75) Inventor: Giao Minh Pham, Milpitas, CA (US)

(73) Assignee: Power Integrations, Inc., San Jose, CA (US)

(*) Notice: Subject to any disclaimer, the term of this patent is extended or adjusted under 35 U.S.C. 154(b) by 16 days.

(21) Appl. No.: 10/798,751

(22) Filed: Mar. 10, 2004

(65) Prior Publication Data

US 2005/0200395 A1 Sep. 15, 2005

(51) Int. Cl.
*H03K 5/08* (2006.01)
*H03L 5/00* (2006.01)

(52) U.S. Cl. ........................ 327/312; 327/313

(58) Field of Classification Search ........ 327/309–313, 327/318, 327–328; 361/56, 90, 90.1, 92
See application file for complete search history.

(56) References Cited

U.S. PATENT DOCUMENTS

| | | | | |
|---|---|---|---|---|
| 4,829,199 A | * | 5/1989 | Prater | 326/27 |
| 5,283,484 A | * | 2/1994 | Brehmer et al. | 327/309 |
| 5,373,202 A | | 12/1994 | Armstrong, II | 326/58 |
| 5,856,760 A | * | 1/1999 | Lam et al. | 330/298 |
| 6,111,449 A | * | 8/2000 | Tobita | 327/327 |
| 6,388,495 B1 | * | 5/2002 | Roy et al. | 327/309 |
| 2001/0033003 A1 | | 10/2001 | Sawahata | 257/355 |
| 2003/0071311 A1 | | 4/2003 | Arai et al. | 257/360 |
| 2003/0090309 A1 | * | 5/2003 | Hunt | 327/309 |

FOREIGN PATENT DOCUMENTS

| | | | |
|---|---|---|---|
| JP | 03091264 A | * | 4/1991 |
| JP | 10190451 A | * | 7/1998 |

OTHER PUBLICATIONS

Feng, H. et al., "A Comparison Study of ESD Protection for RFIC's: Performance vs. Parasitics," *IEEE MTT-S Digest*, vol. 1, Jun. 11, 2000, pp. 143-146.
EP Patent Appln. No. 04257752.8, European Search Report, Nov. 4, 2005.

* cited by examiner

*Primary Examiner*—Quan Tra
(74) *Attorney, Agent, or Firm*—Blakely, Sokoloff, Taylor & Zafman LLP (57) ABSTRACT

A low power method and apparatus for selecting operational modes of a circuit. One circuit according to the teachings of the disclosed method and apparatus includes a first current limiting circuit coupled between a selector terminal and a first voltage bus. The first current limiting circuit is adapted to vary a current limit out of the selector terminal in response to a voltage on the selector terminal. The circuit also includes a second current limiting circuit coupled between the selector terminal and a second voltage bus. The second current limiting circuit adapted to vary a current limit into the selector terminal in response to the voltage on the selector terminal.

16 Claims, 6 Drawing Sheets

METHOD AND APPARATUS FOR ROBUST MODE SELECTION WITH LOW POWER CONSUMPTION

BACKGROUND OF THE INVENTION

1. Field of the Invention

The present invention relates generally to integrated circuits, and more specifically, the present invention relates to integrated circuits that are controllers for switching power supplies.

2. Background Information

It is well known that the use of integrated circuits to replace discrete components in electronic circuits can reduce the cost and size of electronic systems. The use of integrated circuits also reduces the power required to operate those systems. A category of electronic systems that benefits from the use of integrated circuits is electronic power supplies. The parameters of cost, size, and power consumption are especially important in application of these systems. Switching power supplies are of particular interest to designers of electronic systems because the highest performance is generally achieved with switching power supply technology.

To realize the goals of systems designers, integrated circuits for switching power supplies should have options that allow them to be used in a variety of different applications. The integrated circuits should require as few discrete components as possible, and they should consume the lowest possible power in operation. An example of a desirable option is the ability to select different switching frequencies so that an optimal design can be achieved for different applications of a single integrated circuit. The package of the integrated circuit should also have as few terminals as possible to minimize cost.

SUMMARY OF THE INVENTION

Disclosed are methods and apparatuses that allow a selector terminal of a circuit to select optional modes of operation while maintaining low power consumption with reduced sensitivity to noise. In one embodiment, a circuit according to the teachings of the present invention includes a first current limiting circuit coupled between the selector terminal and a first voltage bus. The first current limiting circuit is adapted to vary a current limit out of the selector terminal in response to a voltage on the selector terminal. The circuit also includes a second current limiting circuit coupled between the selector terminal and a second voltage bus. The second current limiting circuit adapted to vary a current limit into the selector terminal in response to the voltage on the selector terminal. Additional features and benefits of the present invention will become apparent from the detailed description, figures, and claims set forth below.

BRIEF DESCRIPTION OF THE DRAWINGS

The present invention detailed illustrated by way of example and not limitation in the accompanying Figures.

DETAILED DESCRIPTION

An embodiment of a method to select multiple optional modes of operation of an integrated circuit is disclosed. The method uses a voltage between a mode selector terminal and a ground reference terminal to select operational modes. It allows one mode of operation corresponding to no connection at the terminal. The method allows the operational mode corresponding to no connection at the terminal to be robust in the presence of noise while reducing the power to maintain the desired selection in all modes of operation.

In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As will be disclosed in this disclosure, an operational mode of a circuit according to the teachings of the present invention is selected when the selector terminal has no external connection and also when it is connected to a source of regulated voltage that can be another terminal on the integrated circuit. When the selector terminal is not connected to a source of regulated voltage, the voltage on the selector terminal is maintained within boundaries in the presence of noise by switched current sources that absorb noise currents at the selector terminal. The current sources change in magnitude according to the voltage on the selector terminal. The magnitudes of the current sources are greatly reduced when the selector terminal is connected to an external voltage that is outside the voltage boundaries for the unconnected selector terminal to reduce the power consumed by the integrated circuit.

Figure 1:
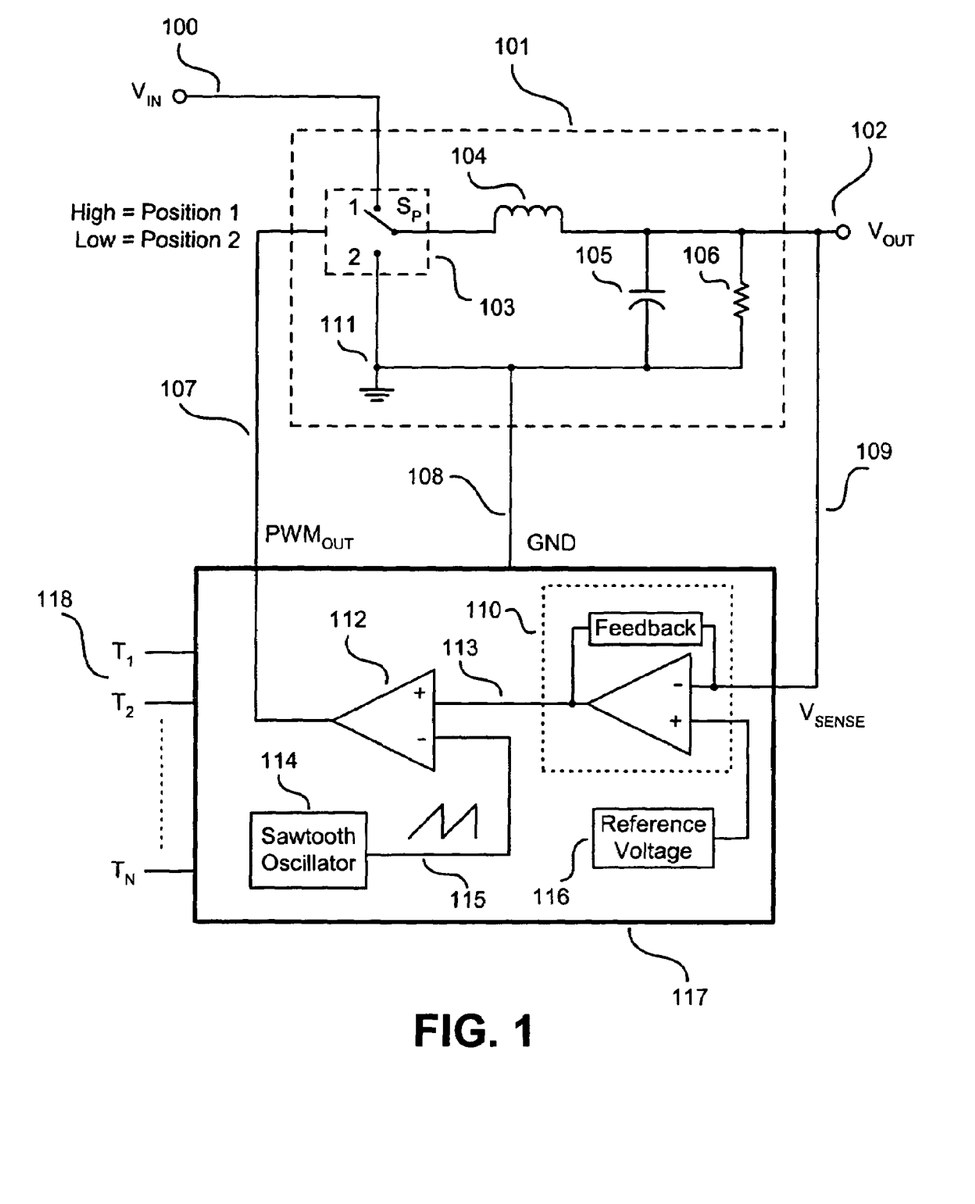
FIG. 1 shows an example of a switching power supply that includes a switching converter and an integrated circuit controller.

FIG. 1 is a diagram of an example switching power supply with an integrated circuit controller that could employ an embodiment of the present invention. An unregulated DC input voltage $V_{IN}$ 100 is converted to a regulated DC output voltage $V_{OUT}$ 102 by switching converter 101 that is controlled by integrated circuit 117. All voltages are with respect to the ground reference 111. The state of a single pole double throw power switch $S_P$ 103 is controlled by the signal $PWM_{OUT}$ 107 from the integrated circuit 117. Switch $S_P$ 103 couples the inductor 104 to the input voltage $V_{IN}$ 100 when $PWM_{OUT}$ on line 107 is high. Switch $S_P$ 103 couples one end of the inductor 104 to the ground reference 111 when the signal PWM$_{OUT}$ on line 107 is low. Capacitor 105 filters the AC current in inductor 104 to provide a substantially DC voltage to the load 106. The frequency of the sawtooth oscillator 114 within integrated circuit controller 117 determines the rate of switching.

A plurality of functional terminals 118 on the integrated circuit 117 can be coupled to operate the various functions of integrated circuit 117 in a desired manner. For example, functional terminals 118 might set the frequency of the oscillator 114. The frequency could take on any number of values depending on the number of terminals used to implement the selection and the stimulus required at functional terminals 118. A stimulus could take the form of a voltage, a current, or the equivalent that could be determined by a discrete component connected between two terminals. A single terminal could select multiple options by connection to multiple levels of voltage or current. In any case, it is desired in one embodiment that the method of selection does not require the use of discrete components, and that the selected options maintain the lowest possible power consumption of the integrated circuit.

Integrated circuit 117 senses the output voltage V$_{OUT}$ 102 of the switching converter 101 at a terminal V$_{SENSE}$ 109 with respect to a ground terminal GND 108. In one embodiment, an error amplifier 110 within the integrated circuit 117 amplifies the difference between the voltage at terminal V$_{SENSE}$ 109 and a reference voltage 116 internal to the integrated circuit 117. A comparator 112 compares the error voltage output 113 of error amplifier 110 to the sawtooth voltage V$_F$ 115 that is an output of the oscillator 114. The output 107 of the comparator 112 is high when the error voltage 113 is greater than sawtooth voltage 115. The output 107 of comparator 112 is low when the error voltage 113 is less than the sawtooth voltage 115. Thus, the periodic switching of power switch S$_P$ 103 is modulated by the integrated circuit 117 in a manner to regulate the output voltage V$_{OUT}$ 102. There are many ways to implement the function of the switch S$_P$ 103 with semiconductor devices, such as for example two transistors, or a transistor and a diode. The combination of switching converter 101 and integrated circuit controller 117 in FIG. 1 is just one example of many different circuits that could be used in switching power supplies.

Figure 2:
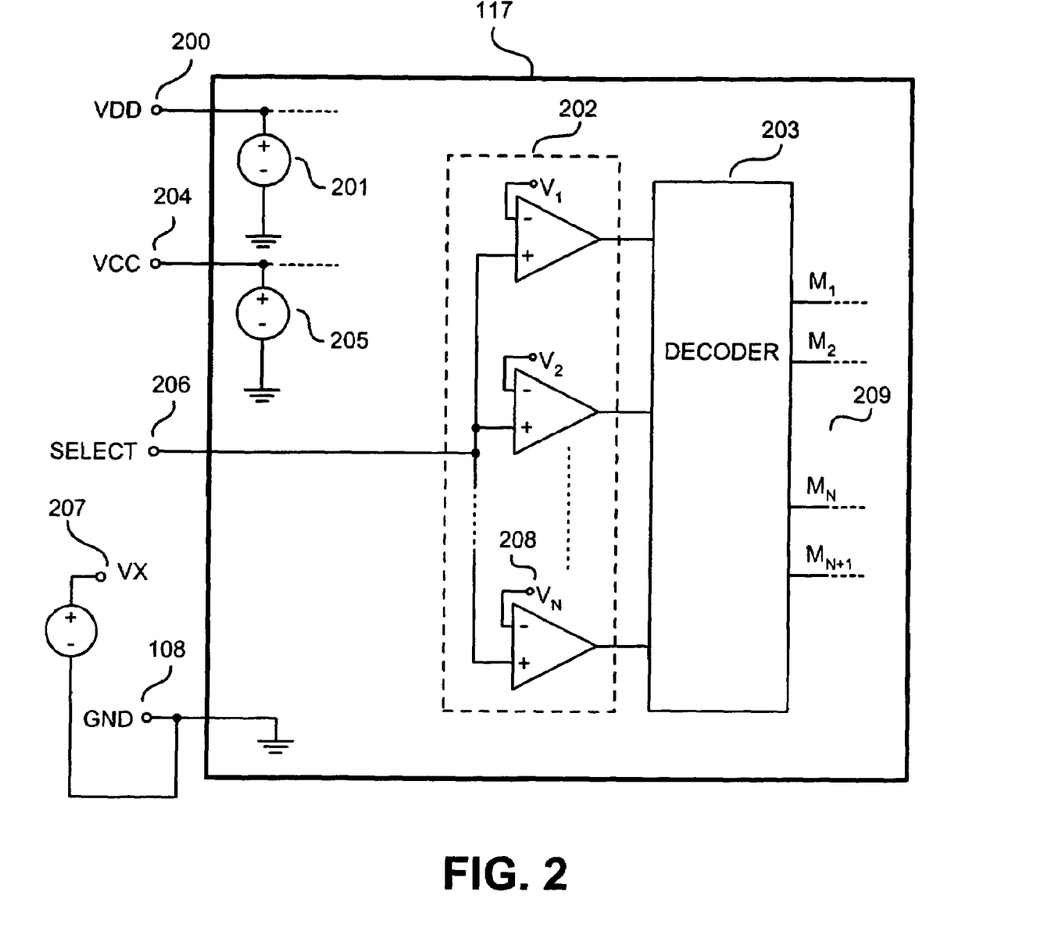
FIG. 2 is a diagram illustrating the principles of a technique that uses the voltage on a terminal of an integrated circuit to select among optional modes of operation.

FIG. 2 illustrates one principle of voltage comparison that can be used in the design of integrated circuit controllers to select among different optional modes of operation, shown in the context of power supply controller 117. All voltages are measured with respect to the ground reference terminal 108. A mode select terminal 206 is coupled to a plurality of voltage comparators 202 that compare the voltage at 206 to the threshold voltages 208. The comparators 202 are coupled to a decoder circuit 203 that produces an output 209 to indicate which mode of operation has been selected by the voltage at the mode select terminal 206.

In the arrangement illustrated in FIG. 2, a plurality of N voltage comparators 202 can determine N+1 distinct modes of operation. Each comparator determines if the voltage at the mode select terminal 206 is higher or lower than one of the threshold voltages 208. With this arrangement, N threshold voltages create N+1 possible selections. Decoder 203 enables the mode of operation that corresponds to the voltage at mode select terminal 206.

The user sets the voltage on the mode select terminal 206 at the value appropriate for the desired optional mode of operation. One appropriate value could be zero, corresponding to a connection of the mode select terminal 206 to the ground reference terminal 108. Other appropriate values could be from internally generated voltages that are available at other functional terminals of the integrated circuit, such as voltage VDD at terminal 200 from internal voltage source 201, and VCC at terminal 204 from internal voltage source 205 in this illustration. For purposes of this disclosure, it is noted that voltage VDD at terminal 200 may be referred to as a first voltage bus and the ground reference terminal 108 may be referred to as a second voltage bus. An appropriate voltage could also be obtained from an external circuit as represented by voltage VX at node 207 in FIG. 2.

All the voltages may be obtained by direct connection of the mode select terminal 206 to a node in the power supply or to a terminal of the circuit. No discrete components are required to select an optional mode of operation. To obtain the maximum number of optional modes that may be selected with the mode select terminal 206, the unconnected or open circuit state of terminal 206 should also correspond to a predetermined mode of operation. Therefore, when mode select terminal 206 has no external connection, its voltage must be bounded between thresholds of the comparators 202.

It is appreciated that the arrangement in FIG. 2 cannot meet the requirement for no external connection on the mode select terminal 206 because the voltage at 206 is undetermined when 206 has no external connection. Moreover, the unconnected mode select terminal 206 is a high impedance node, whose voltage is strongly influenced by noise currents. Switching power supplies have electric and magnetic fields that can inject noise currents at the mode select terminal 206. Small noise currents with the high impedance at the mode select terminal 206 will produce voltages that cause the unintended selection of modes.

Figure 3:
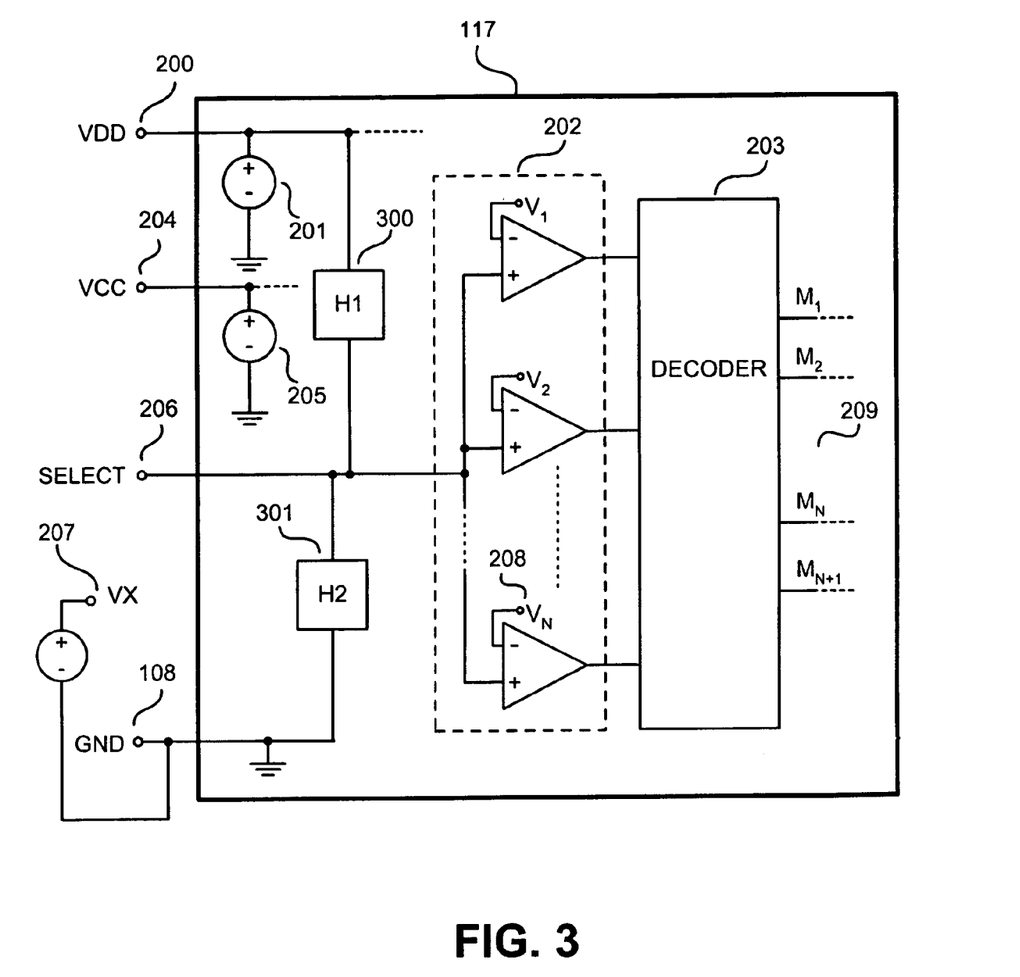
FIG. 3 shows the elements added to the technique illustrated in FIG. 2 to select optional modes of operation.

FIG. 3 shows additional internal circuits 300 and 301 that may be used to determine the voltage at 206 when select terminal 206 has no external connection. The internal circuits 300 and 301 also allow the selection of optional modes with mode selection terminal 206 while limiting power consumption of the integrated circuit 117. Furthermore, the circuits 300 and 301 must maintain the voltage on the mode select terminal 206 between boundaries in the presence of noise when there is no external connection to the mode select terminal 206.

One technique to sense multiple states through a terminal of an integrated circuit, including a state corresponding to no connection at the terminal, requires the circuit to sense the current at the terminal, and to determine if the current is sourced to the terminal or sinked from the terminal. This technique, however, fails to reduce the power consumption of circuitry that is coupled to the terminal.

Figure 4:
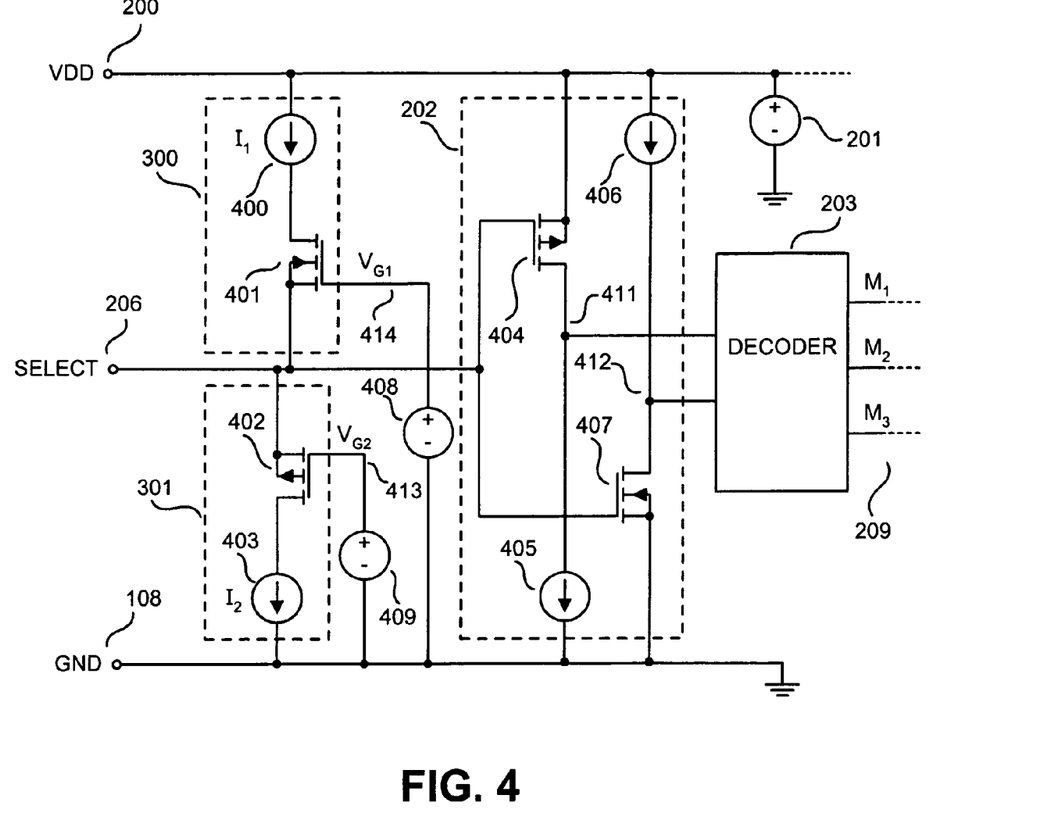
FIG. 4 is a schematic illustration of functional blocks in FIG. 3.

FIG. 4 shows an embodiment of circuits 300 and 301 including additional circuitry that senses the voltage directly on the mode select terminal 206. The embodiment illustrated in FIG. 4 does not require sensing of current into or out of the mode select terminal 206. Accordingly, the embodiment illustrated in FIG. 4 provides robust limits on the voltage at the mode select terminal 206 when terminal 206 has no external connection, but lacks the desired property of reduced power consumption.

In the embodiment illustrated in FIG. 4, circuits 300 and 301 are current limiting circuits that are engaged by transistor switches 401 and 402 respectively. For purposes of this disclosure, a switch may be defined as a device that controls the passage of electric current. A switch can allow any magnitude of current from zero current to the maximum current available to it, depending on its stimulus. As shown in FIG. 4, transistors 401 and 402 have their respective gates held at respective voltages V$_{G1}$ 414 and V$_{G2}$ 413 by respective internal voltage sources 408 and 409. In one embodiment, $V_{G1}$ is less than or equal to $V_{G2}$. Transistors 401 and 402 do not conduct as long as the voltage on terminal 206 is between a lower voltage boundary and an upper voltage boundary. In one embodiment, the lower voltage boundary is $V_{G1}$ minus the gate threshold voltage of transistor 401 while the upper voltage boundary is $V_{G2}$ plus the gate threshold voltage of transistor 402. Noise currents that move the voltage on 206 to either the upper voltage boundary or the lower voltage boundary will cause either 401 or 402 to conduct. The current in transistor 401 is limited to $I_1$ by a current limit circuit that is current source 400. The current in transistor 402 is limited to $I_2$ by a current limiting circuit that is current source 403. The voltage on terminal 206 will not go higher than the upper voltage boundary or lower than the lower voltage boundary as long as the noise current does not exceed respective current limits $I_2$ of current source 403 or $I_1$ of current source 400. The open circuit condition is robust because the voltage on the mode select terminal 206 has to go substantially higher than the upper voltage boundary or substantially lower than the lower voltage boundary to select a different mode of operation.

In one embodiment, transistors 404 and 407 conduct when the voltage on the mode select terminal 206 is between the lower voltage boundary and the upper voltage boundary. Thus, the operational mode corresponding to an open circuit on terminal 206 is set by the conduction of both transistors 404 and 407. Thus, transistors 404 and 407 behave like voltage comparators. The reference voltage for the comparator comprised of transistor 404 is VDD minus the gate threshold voltage of transistor 404. The reference voltage for the comparator comprised of transistor 407 is the ground reference 108 plus the gate threshold of transistor 407. To select a different mode of operation, the voltage on the mode select terminal 206 must go higher than VDD minus the gate threshold voltage of transistor 404 or lower than the ground reference plus the gate threshold voltage of transistor 407. Noise current can cause the voltage on the mode select terminal 206 to go high enough or low enough to change the mode of operation only if the noise current entering terminal 206 is greater than current limit $I_2$ of current source 403 or if the noise current leaving terminal 206 is greater than current limit $I_1$ of current source 400. High immunity to noise is achieved by making $I_1$ and $I_2$ large.

In the circuit of FIG. 4, current source 400 has the single constant value $I_1$ and current source 403 has the single constant value $I_2$. A disadvantage with making $I_1$ and $I_2$ large is that the mode select terminal 206 will conduct the large current $I_1$ or $I_2$ when the other modes of operation are selected. Large current requires proportionally large power from the internal or external voltage source that provides the current, and the circuit that receives the current consumes the power. It is desirable to consume as little power as possible and at the same time provide high immunity to noise.

Figure 5:
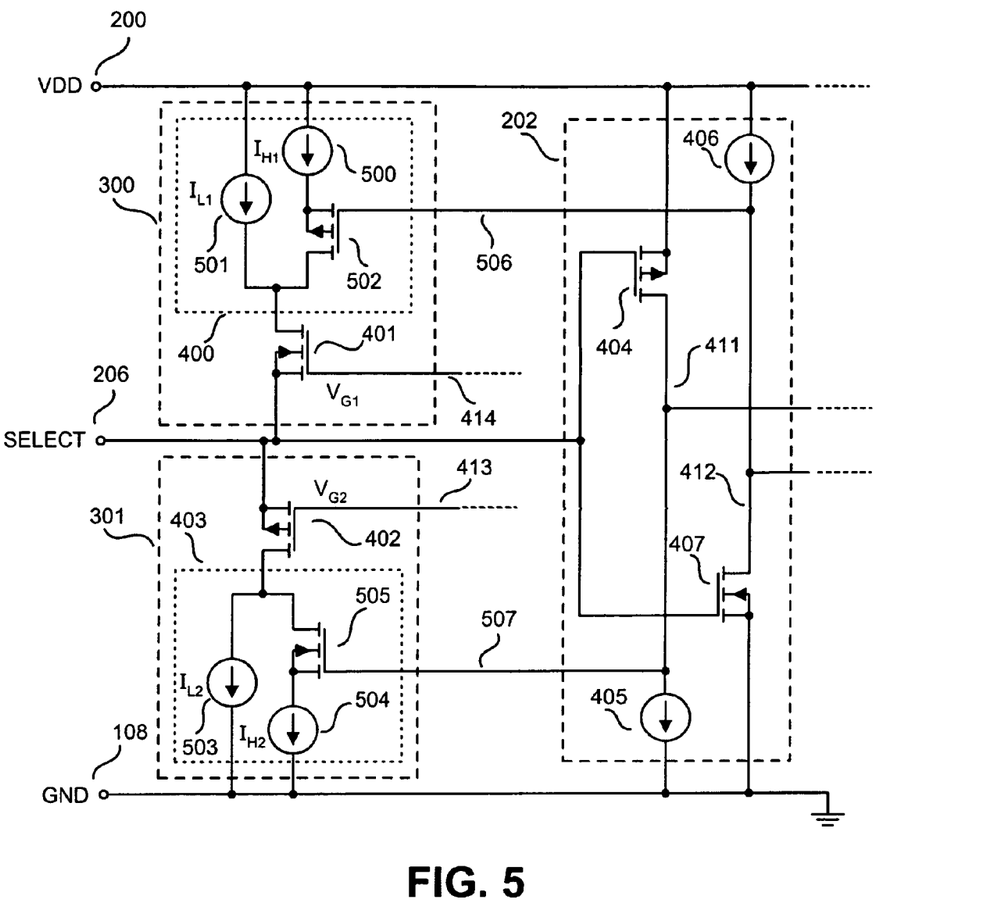
FIG. 5 is a schematic of one embodiment of a method and apparatus to select optional modes of operation in accordance with the teachings of the present invention.

FIG. 5 shows one embodiment of a circuit that solves the problem of large power consumption while maintaining high immunity to noise on the mode select terminal 206. In one embodiment, the circuit of FIG. 5 may be a selector circuit, which may be included in an integrated circuit device. In one embodiment, the integrated circuit device may be a controller of a switching power supply, such as for example one similar to that illustrated in FIG. 1. As illustrated in the circuit embodiment in FIG. 5, circuit 300 is coupled between selector terminal 206 and a first voltage bus, shown in the depicted embodiment as VDD 200. Similarly, circuit 301 is coupled between selector terminal 206 and ground reference terminal 108. It is appreciated that VDD 200 and ground terminal 108 may be considered as first and second voltage busses. As will be discussed, in operation, circuit 300 is adapted to vary a current limit out of selector terminal 206 in response to the voltage at selector terminal 206 and circuit 301 is adapted to vary a current limit into selector terminal 206 in response to the voltage at selector terminal 206. In one embodiment, the circuit also includes a plurality of voltage comparators 202 coupled to selector terminal 206 and coupled to circuits 300 and 301. In one embodiment, the plurality of voltage comparators are also coupled to a decoder circuit such as for example decoder circuit 203.

The embodiment in FIG. 5 also shows that circuit 300 includes a variable current source 400 and that circuit 301 includes a variable current source 403. It is noted that whereas the current limiting circuit 400 in FIG. 4 is fixed at a single value $I_1$, the current limiting circuit 400 in FIG. 5 is a variable current limit circuit with at least two possible values: a high value and a low value. Similarly, whereas the current limiting circuit 403 in FIG. 4 is fixed at a single value $I_2$, the current limiting circuit 403 in FIG. 5 is also a variable current limit circuit with at least two possible values: a high value and a low value. In each current limiting circuit 400 and 403 in FIG. 5, the high value is engaged to obtain high immunity to noise when the voltage on the mode select terminal 206 has no external connection. In one embodiment, the low value is engaged when the mode select terminal 206 is connected to a hard voltage source that does not require the high current for immunity to noise. The low value needs to be only large enough to return the voltage on the mode select terminal 206 to between the two boundaries that are defined by $V_{G1}$, $V_{G2}$, and the respective gate threshold voltages of transistors 401 and 402 when the mode select terminal is disconnected from the hard voltage source.

In the embodiment of FIG. 5, the variable current limiting circuit 400 includes two fixed current sources. One fixed current source is current source 501, which has a magnitude $I_{L1}$. The other fixed current source is current source 500, which has a magnitude $I_{H1}$. The magnitude of current source 501 is substantially less than the magnitude of current source 500. Transistor switch 502 determines whether or not the high magnitude current source 500 adds to the low magnitude current source 501.

Similarly, the variable current limiting circuit 403 in FIG. 5 includes two fixed current sources. One fixed current source is current source 503, which has a magnitude $I_{L2}$. The other fixed current source is current source 504, which has a magnitude $I_{H2}$. The magnitude of current source 503 is substantially less than the magnitude of current source 504. Transistor switch 505 determines whether or not the high magnitude current source 504 adds to the low magnitude current source 503.

In one embodiment, the variable current limiting circuit 400 in FIG. 5 switches from a high current to a low current when the voltage on the mode select terminal 206 is less than a gate threshold voltage of transistor 407 above the ground reference. This voltage near the ground reference on the mode select terminal 206 selects a different mode of operation. The switching between high and low values is accomplished by transistor 502 that is coupled to the output 412 of a voltage comparator comprised of transistor 407. The high current limit that gives immunity to noise is not required under this condition because in practice the voltage on the mode select terminal 206 will be fixed by an external connection to a hard voltage such as for example the ground reference terminal 108.

Similarly, the variable current limiting circuit 403 in the embodiment of FIG. 5 switches from a high current to a low current when the voltage on the mode select terminal 206 is greater than the voltage VDD at terminal 200 minus the gate threshold voltage of transistor 404. This voltage near VDD on the mode select terminal 206 selects a different mode of operation. The switching of the current source between high and low values is accomplished by transistor 505 that is coupled to the output 411 of a voltage comparator comprised of transistor 404. The high current that gives noise immunity is not required under this condition because in practice the voltage on mode select terminal 206 will be fixed by an external connection to a regulated voltage such as for example VDD terminal 200.

Figure 6:
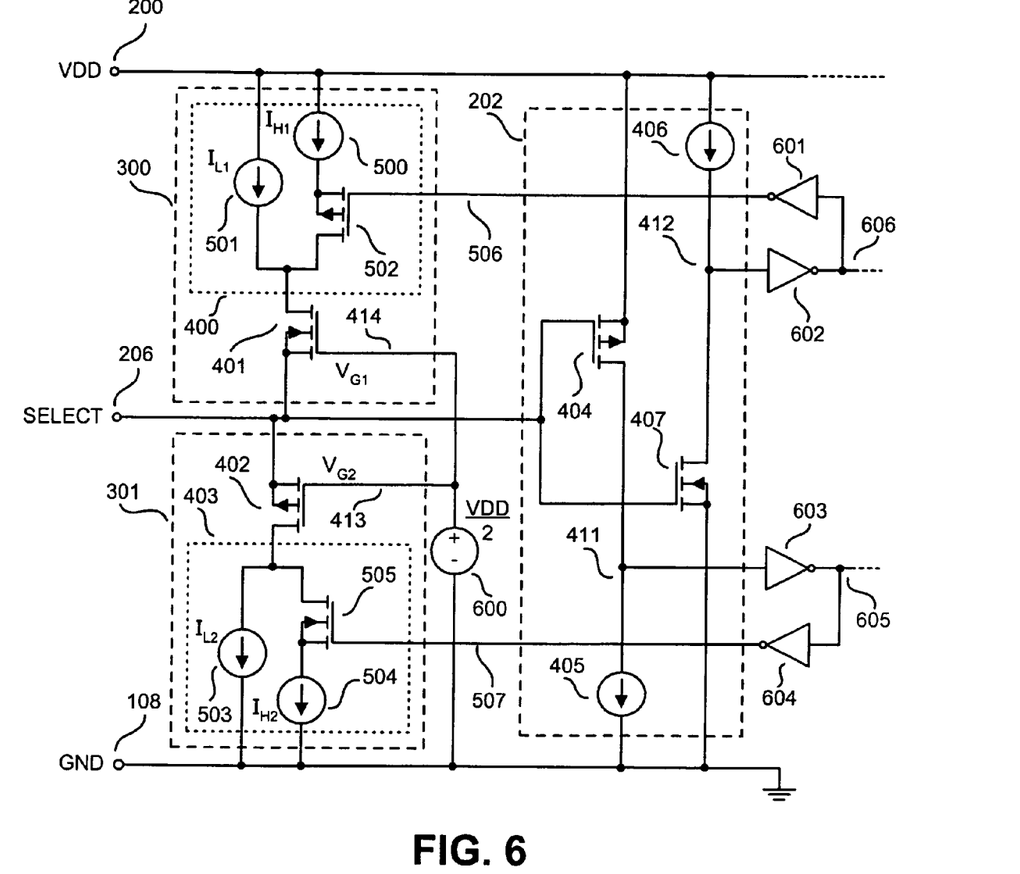
FIG. 6 is a schematic of another embodiment of the method and apparatus to achieve the selection of optional modes of operation in accordance with the teachings of the present invention.

FIG. 6 is a schematic illustrating another embodiment of the present invention in which inverters 601, 602, 603 and 604 are added to the embodiment of FIG. 5. In the illustrated embodiment, inverters 601, 602, 603 and 604 help assure that the signals at the lines 506, 606, 605 and 507 respectively have sufficient drive for reliable operation. In the embodiment of FIG. 6, the gate 414 of transistor 401 and the gate 413 of transistor 402 are coupled to a reference voltage 600, which in one embodiment is half the power supply voltage VDD 200. The value of half the power supply voltage VDD for the reference voltage 600 in the embodiment of FIG. 6 gives the greatest immunity to noise when the mode select terminal 206 has no external connection.

In the foregoing detailed description, the method and apparatus of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A circuit, comprising:
a first current limiting circuit including a first switch and a first current source coupled between a selector terminal and a first voltage bus, wherein one mode of operation of an integrated circuit is selected when there is no external connection to the selector terminal and another mode of operation of the integrated circuit is selected when a voltage at the selector terminal is fixed by an external connection to a regulated voltage, the first current limiting circuit having a first fixed current limit value and a third fixed current limit value, the first current limiting circuit adapted to limit a current out of the selector terminal to the first fixed current limit value or the third fixed current limit value in response to a voltage on the selector terminal; and
a second current limiting circuit including a second switch and a second current source coupled between the selector terminal and a second voltage bus, the second current limiting circuit having a second fixed current limit value and a fourth fixed current limit value, the second current limiting circuit adapted to limit a current into the selector terminal to the second fixed current limit value or the fourth fixed current limit value in response to the voltage on the selector terminal.

2. The circuit of claim 1 further comprising a plurality of voltage comparators coupled to the selector terminal.

3. The circuit of claim 2 further comprising decoder circuit coupled to the plurality of voltage comparators.

4. The circuit of claim 1 wherein the first current limiting circuit further includes a first variable current source comprising the first current source and a third current source coupled between the first voltage bus and the selector terminal.

5. The circuit of claim 4 wherein the first switch is adapted to conduct when the voltage on the selector terminal is below a first threshold voltage, wherein the first switch is adapted not to conduct when the voltage on the selector terminal is above a second threshold voltage.

6. The circuit of claim 5 wherein the second current limiting circuit further includes a second variable current source comprising the second current source and a fourth current source coupled between the selector terminal and the second voltage bus.

7. The circuit of claim 6 wherein the second switch is adapted to conduct when the voltage on the selector terminal is above a third threshold voltage, wherein the second switch is adapted not to conduct when the voltage on the selector terminal is below a fourth threshold voltage.

8. The circuit of claim 7 wherein the first current limiting circuit is adapted to limit the current out of the selector terminal to the first fixed current limit value when the voltage on the selector terminal is below a fifth threshold voltage, wherein the first current limiting circuit is adapted to limit the current out of the selector terminal to the third fixed current limit value when the voltage on the selector terminal is above a sixth threshold voltage.

9. The circuit of claim 8 wherein the second current limiting circuit is adapted to limit the current limit into the selector terminal to the second fixed current limit when the voltage on the selector terminal is above a seventh threshold voltage, wherein the second current limiting circuit is adapted to limit the current into the selector terminal to the fourth fixed current limit when the voltage on the selector terminal is below an eighth threshold voltage.

10. The circuit of claim 7 wherein the first threshold voltage and the second threshold voltage are less than the third threshold voltage and the fourth threshold voltage.

11. The circuit of claim 8 wherein the fifth threshold voltage and the sixth threshold voltage are lower than the first threshold voltage and the second threshold voltage.

12. The circuit of claim 9 wherein the seventh threshold voltage and the eighth threshold voltage are higher than the third threshold voltage and the fourth threshold voltage.

13. The circuit of claim 8 wherein the first fixed current limit is less than the second fixed current limit.

14. The circuit of claim 9 wherein the third fixed current limit is less than the fourth fixed current limit.

15. The circuit of claim 1 wherein the circuit is included in the integrated circuit device.

16. The circuit of claim 15 wherein the integrated circuit device is a controller in a switching power supply.

* * * * *